(12) United States Patent
Gusterson (10) Patent No.: US 6,347,131 B1
(45) Date of Patent: Feb. 12, 2002

(54) NON-CONTACT VOLUME MEASUREMENT (75) Inventor: Stephen Philip Gusterson, Northants (GB)

(73) Assignee: Cintex Limited, Colnbrook (GB)

( * ) Notice: Subject to any disclaimer, the term of this patent is extended or adjusted under 35 U.S.C. 154(b) by 0 days.

(21) Appl. No.: 09/431,856

(22) Filed: Nov. 2, 1999

(51) Int. Cl.$^7$ .............................................. G01B 15/02
(52) U.S. Cl. ........................ 378/54; 378/51; 378/56; 378/57
(58) Field of Search .......................... 378/51, 54, 56, 378/57

(56) References Cited

U.S. PATENT DOCUMENTS

| | | | |
|---|---|---|---|
| 3,737,237 A | 6/1973 | Zurasky | 356/388 |
| 4,366,382 A | 12/1982 | Kotowski | 378/57 |
| 4,495,635 A | 1/1985 | Dobbs | 378/56 |
| 4,720,808 A * | 1/1988 | Repsch | 702/175 |
| 4,928,257 A * | 5/1990 | Yerkes et al. | 702/40 |
| 5,125,015 A * | 6/1992 | Shimoni et al. | 378/51 |
| B1 4,366,382 | 1/1996 | Kotowski | 378/57 |
| 5,504,794 A | 4/1996 | Campas et al. | 378/54 |
| 5,585,603 A | 12/1996 | Vogeley, Jr. | 177/25.13 |
| 5,600,700 A * | 2/1997 | Krug et al. | 378/57 |
| 6,088,423 A * | 7/2000 | Krug et al. | 378/57 |
| 6,167,113 A * | 12/2000 | Armentrout et al. | 378/54 |
| 6,173,038 B1 * | 1/2001 | Siffert et al. | 378/56 |
| 6,215,845 B1 * | 4/2001 | Knigge | 378/57 |

FOREIGN PATENT DOCUMENTS

| | | | |
|---|---|---|---|
| EP | 0212078 | 8/1985 | G01B/15/02 |
| EP | 0233389 | 8/1987 | G01N/23/16 |
| GB | 2225423 | 5/1990 | G01N/23/02 |

OTHER PUBLICATIONS

U.K. Search Report, Dec. 22, 1999.

* cited by examiner

Primary Examiner—Robert H. Kim
Assistant Examiner—Allen C. Ho
(74) Attorney, Agent, or Firm—Gardner, Carton & Douglas

(57) ABSTRACT

There is described a method and apparatus for measuring the volume of an object by means of penetrating radiation. The object is placed in an irradiation zone and measurements of amounts of radiation passing through respective areas of the object are made. From each measurement, a value representative of the "thickness" of the object at that area is derived, and by adding the representative values, a "volume" is calculated. The object is preferably moved through the irradiation zone, while radiation is measured by means of a linear array of sensors extending perpendicularly to the movement direction.

19 Claims, 8 Drawing Sheets

| OUTPUT | DIODE | | | | | |
|---|---|---|---|---|---|---|
| | 1 | 2 | 3 | 4 | -- | n |
| D0 | D0.1 | D0.2 | D0.3 | D0.4 | -- | D0n |
| D1 | D1.1 | D1.2 | D1.3 | D1.4 | -- | D1.n |
| D2 | D2.1 | D2.2 | D2.3 | D2.4 | -- | D2.n |
| D3 | D3.1 | D3.2 | D3.3 | D3.4 | -- | D3.n |
| -- | -- | -- | -- | -- | -- | -- |
| -- | -- | -- | -- | -- | -- | -- |
| DN | -- | -- | -- | -- | -- | DN.n |

NON-CONTACT VOLUME MEASUREMENT

FIELD OF INVENTION

The present invention relates to methods and apparatus to effect non-contact measurement of the volume of an object. The invention particularly concerns an apparatus and method for use in an inspection system, for monitoring the content of package and optionally rejecting packages falling outside acceptable volumetric parameters.

BACKGROUND OF THE INVENTION

In many production processes, inspection of the product is carried out at various stages during the production process, and particularly immediately prior to final packaging and dispatch of the product. In processes for the commercial production of foodstuffs, for example, there is a requirement to ensure that each package of a prepared foodstuff contains the proper amounts of the various components of the foodstuff, prior to its shipping from the factory. As an example, in the production of ready-to-prepare meals comprising a number of pouches or sachets which are packaged in an outer wrapper, it is necessary to inspect the packages to determine that all of the pouches or sachets are present.

In a conventional installation for inspecting products such as foodstuffs, prepared meats, or other materials permable to x-rays, there is provided a conveyor for transporting the packaged products. Above the conveyor a source of x-rays directs a wide beam of x-rays onto the conveyor surface, the x-ray beam being shaped by an aperture plate to form a narrow irradiation zone extending across the width of the conveyor, Beneath the conveyor, and aligned with the irradiation zone, a linear array of photodiodes is arranged to extend across the width of the conveyor. A phosphorescent strip is mounted above the array of photodiodes to extend transversely to the direction of the conveyor, so that x-rays from the source pass between the aperture plates, through the product and the conveyor, and strike the phosphorescent strip. Each point along the length of the phosphorescent strip emits visible light in proportion to the strength of the x-radiation striking the strip at that point, and this visible light is converted by the array of photodiodes into electrical signals. The signal from each photodiode represents the strength of the x-ray beam at the corresponding point across the width of the conveyor.

The thickness and density of the product modulates the intensity of the x-radiation striking the photophorescent strip, and thus modulates the amount of visible light emitted at each point along the length of the phosphorescent strip. The array of photodiodes detects this modulated light emission, and by repeatedly sampling the outputs of the individual photodiodes in the linear array of photodiodes, the product is scanned as it passes through the irradiation zone. The outputs of the photodiodes are conventionally displayed as a video image of the passing product.

In the case of prepared meat products, any bones remaining in the meat will resist penetration of x-rays to a greater extent than will the meat, and thus the photodiode which falls in the "shadow" of the bone will be illuminated to a lesser extent than will photodiodes which receive x-rays passing through the meat. The presence of any bone or other body more resistant to x-rays can be detected in the video image as a dark area. The product concerned may then either be re-processed or discarded from the production line.

In an alernative use for the inspection equipment, detection of the absence of a product may be effected. For example, in the final inspection of multiply packaged food items such as cakes or pies, the packages may pass through the irradiation zone and the photdiode outputs are used to form a video image of the packaged items. By monitoring the image, the number of items present within the package can be verified, since a missing item result in a lighter image area than would otherwise be expected. The package may then be rejected.

In the simple detection processes described above, the detected light level is compared by the operative monitoring the video display with a predeterminced "ideal image", and a decision is made on the basis of whether the image is too dark, when foreign bodies are to be detected, or the image is too bright when the absence of an inspected item is to be detected.

Detection in either case is thus dependent on the reliability of the operative monitoring the video display, and difficulties with inspection equipment of this type frequently occur if the operative is distracted or suffers a lapse of concentration.

BRIEF DESCRIPTION OF THE DRAWINGS

An objective of the present invention is to provide a method of measuring the volume of an object be detecting the attenuation of radiation passing through the object.

In a preferred embodiment, an inspection method is provided which derives a measure of a volumetric parameter of the inspected object by detecting x-ray signals passing through the object.

A further objective of the present invention is to provide an inspection apparatus wherein a volumetric measurement of an object passing through a radiation zone is determined on the basis of the outputs of an array of detectors sensing radiation which has passed through the object.

A further objective of the present invention is to provide an automatic inspection installation for inspecting a series of items which can indicate those items falling out with predetermined inspection parameters.

According to a first aspect of the present invention, there is provided a method of inspecting a product wherein the product is placed in an irradiation zone wherein penetrating radiation may pass through the product and impinge on a detector, the method comprising measuring a first amount of radiation passing through a first area of the product and impinging on the detector, deriving from said first amount a first value representative of the thickness of said first area of the product, measuring a second amount of radiation passing through a second area of the product and impinging on the detector, deriving from said second amount a second value representative of the thickness of said second area of the product; and adding said first value and second value.

Preferably, the detector comprises first and second sensors, and said steps of measuring said first and said second amounts comprise measuring radiation incident on each respective sensor. Most preferably, the radiation is x-radiation.

Advantageously, the inspection method may include a calibration step wherein a test body is placed in the irradiation zone and a test amount of radiation impinging on the detector is measured and the test measurement stored. In a preferred development, a plurality of test bodies are placed in the irradiation zone sequentially during the calibration step, and a series of test measurements corresponding to respective test bodies is stored.

Most preferably, the derivation steps comprise comparing said first and second amounts with previously-stored test measurements.

According to a second aspect of the present invention, there is provided an inspection apparatus comprising a radiation source, an irradiation zone wherein a product to be inspected may be placed, and a detector for detecting radiation from the source passing through the irradiation zone, the apparatus further comprising measuring means for measuring a first amount of radiation passing through a first area of the product and impinging on the detector, calculating means for deriving from said first amount a first value representative of the thickness of said first area of the product, measuring means for measuring a second amount of radiation passing through a second area of the product and impinging on the detector, calculating means for deriving from said second amount a second value representative of the thickness of said second area of the product, and addition means for adding said first value and said second value.

In a preferred embodiment, the apparatus further includes comparing means for comparing the added first and second values with a threshold value, and providing an output based on the result of the comparison.

Most preferably, the inspection apparatus further includes means for moving a product through the irradiation zone.

Embodiments of the present invention will now be described in detail with reference to the accompanying drawings, in which.

DETAILED DESCRIPTION OF THE INVENTION

Figure 1:
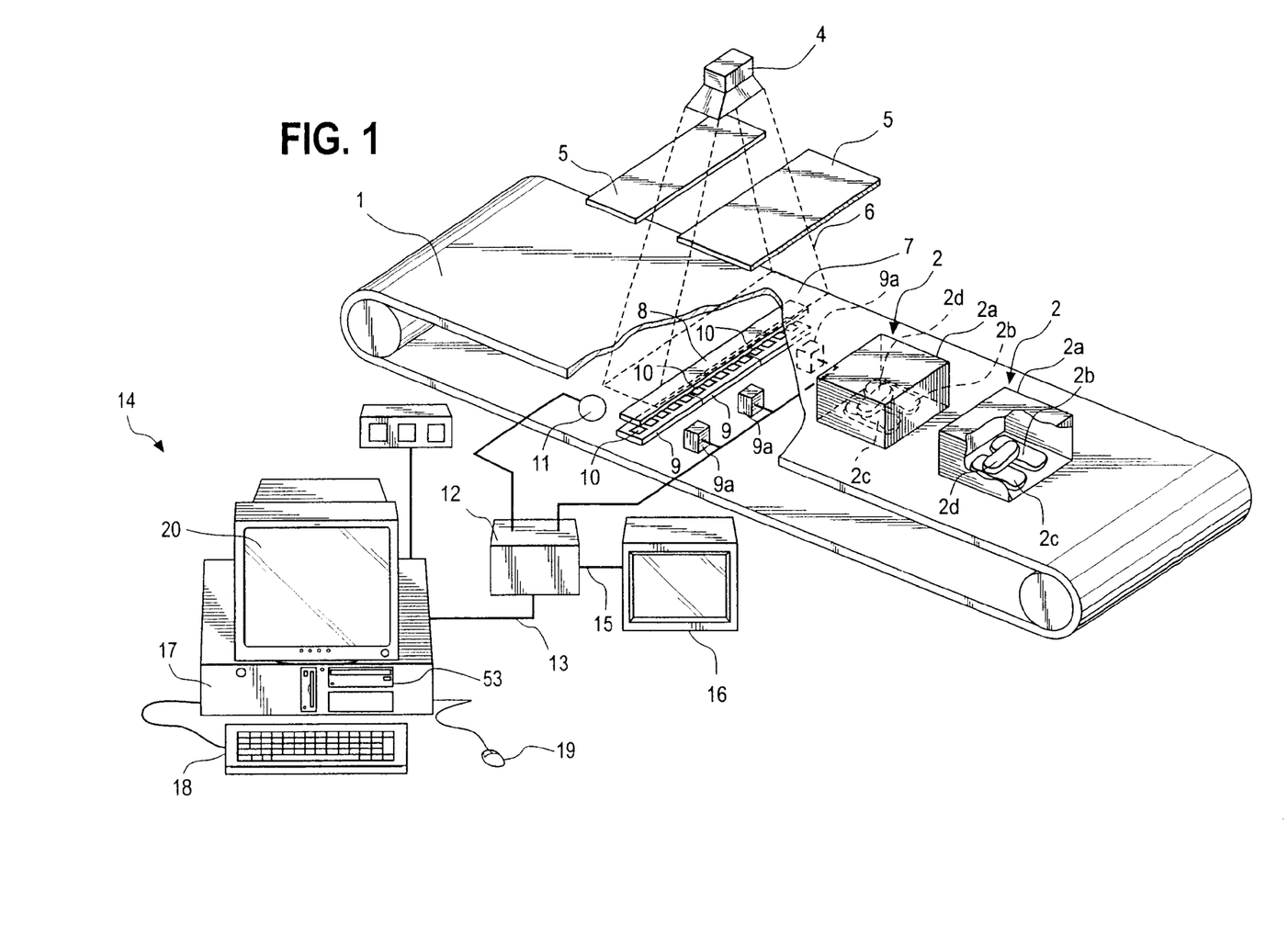
FIG. 1 is a schematic perspective view of an inspection installation.

Referring to FIG. 1, an inspection installation is shown in which a conveyor 1 carries a series of products 2 at a known speed through the inspection installation in the direction of the arrow A. In the example shown, each product comprises a package 2a containing three items 2b, 2c and 2d. The items may be of indeterminate shape, such as flexible plastics pouches containing an agueous liquid such as a culinary sauce. Alternatively, the items may be chilled or frozen meat or meat products, or packets of dried ingredients such as pasta, flour, powdered milk, etc. The product may be any radiation-permeable substance, and is not limited to food or pharmaceutical preparations.

Above the conveyor 1 is positioned a radiation source 4 and a pair of aperture plates 5. The aperture plates 5 are opaque to the radiation from the radiation source 4, and shape a radiation beam 6 from the source 4 so that it falls on the conveyor to define an irradiation zone 7 extending across the width of the conveyor.

Situated below the conveyor 1 and aligned with the irradiation zone 7 is a phosphorescent strip 8, below which is disposed a linear array 9 of photodiodes 10. The phosphorescent strip 8 is sensitive to the radiation beam 6, and emits visible light toward the photodiodes 10 when radiation from the source 4 impinges on the strip 8. The array 9 of photodiodes may be formed as a single module, or may comprise a number of modules arranged to form a linear array of photodiodes extending across the entire width of the conveyor 1. Each of the modules of the array 9 has associated with it a sensor module controller 9a, which carries out initial processing of the analogue outputs from the photodiodes 10 of the array 9.

Signals from the sensor module controllers 9a are fed to a sensor controller 12. The sensor controller 12 provides an output which is fed via a line 13 to a further processing apparatus (in this case a personal computer 14), and may optionally also provide a video output via a line 15 to a display terminal 16 to provide a real-time monochrome video image of the products passing along the conveyor. The sensor controller 12 may be a separate unit, as seen in FIG. 1, or may be a circuit board or card fitted internally in a larger processing apparatus such as the personal computer 14. The personal computer 14 comprises a processing unit 17, input devices such as keyboard 18 and mouse 19, and a display 20.

Figure 2:
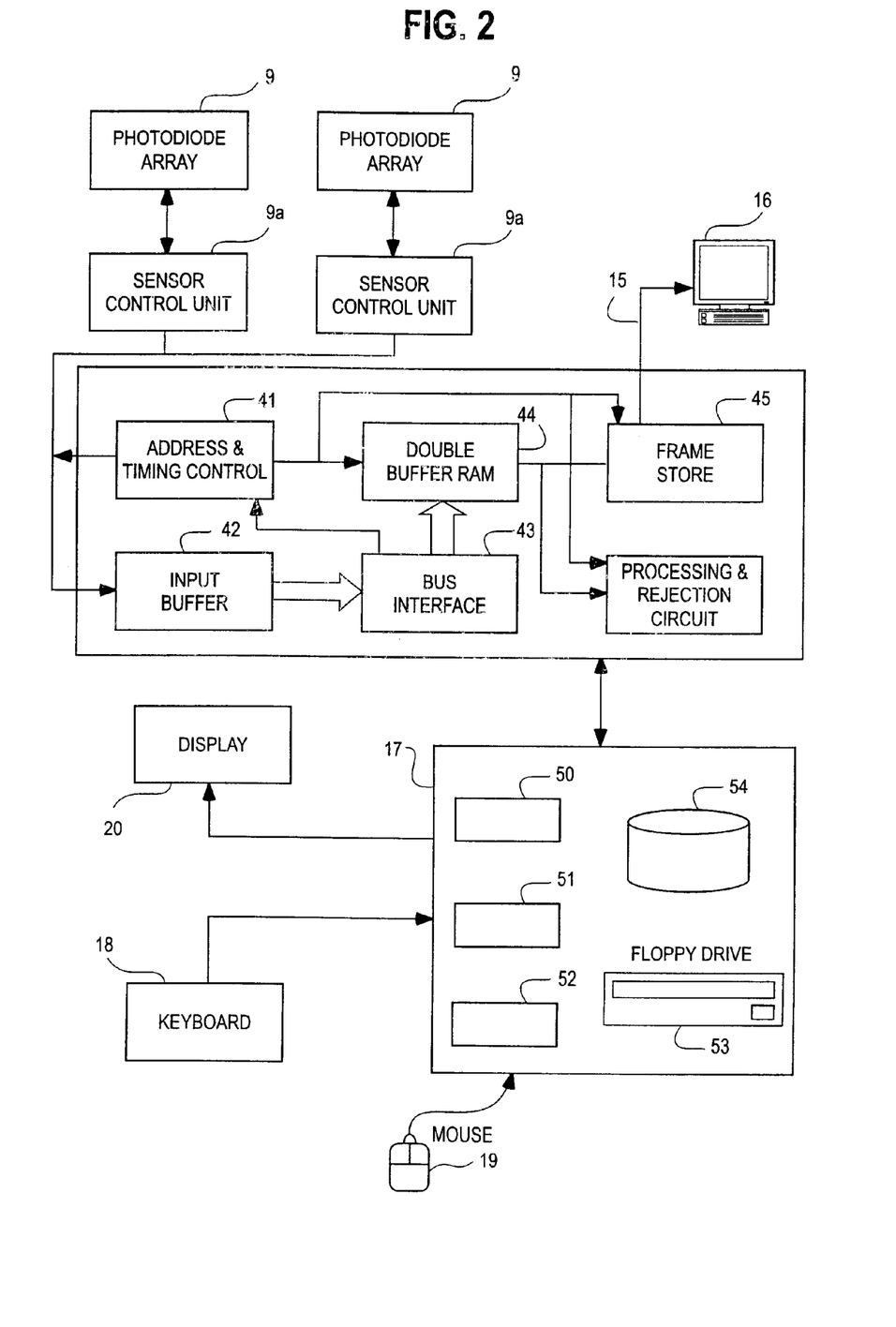
FIG. 2 is a block diagran showing the operative connection of the electronic elements of the installation.

FIG. 2 is a block diagram illustrating the structure of the electronic elements of the installation. Referring now to FIG. 2, each photodiode 10 provides an analogue signal over a period of time to a control unit 9a, wherein an integration circuit adds the signals cumulatively, and stores an analogue signal for each photodiode 10 indicative of the radiation dose striking the corresponding part of the phosphorescent strip 8 during that time period. For each timing interval, a digital value representing the radiation falling on each of the photodiodes 10 of the module 9 is calculated, and is stored in a temporary memory. The sets of values are then supplied to the sensor controller 12.

The sensor controller 12 is connected to all of the sensor control units 9a and preferably also to a temperature sensing element 11. The sensor controller 12 comprises six main components. An address and timing control circuit 41 communicates with the sensor control units 9a to request them in turn to send their stored radiation values for a particular timing interval, and also requests data from the temperature sensing element 11 corresponding to that timing interval. The temperature information may be used to correct the outputs of photodiodes 10 for variations of their performance with temperature as described in our copending UK patent applicatin No. 9920159.2. The signals are received in an input buffer 42 and are fed via a bus interface 43 to a double buffer RAM 44 which can store two sets of temperature and radiation values corresponding to all of the photodiodes 10 in the entire array 9. The stored signals correspond to the radiation values for all photodiodes 10, gathered in the previous and in the current timing intervals. Input to the RAM 44 is controlled by the address and timing control circuit 41. The values stored in the ram 44 may be used in a frame store 45 to construct video image frmaes which may be sent via a video output line 15 to a monitor 16 to display a video image of the products.

In terms of the digital output of th diode array, it is desirable that the range of each diode be divided into the same number of steps, so that each diode output will correspond to one of a predetermined number of illumination levels. In a typical application, the range of each diode is divided into 256 steps and thus the diode output will correspond to a digital value between 0 and 255. It is, however, foreseen the range may be divided into a different number of steps, depending on the commodity under the inspection.

The processing unit 17 is provided in a conventional manner with a display 20 and input devices such as keyboard 18 and mouse 19. The processing unit 17 comprises a processor 50, working memory (RAM memory) 51, ROM memory 52 for storing executable programmes, mass storage 54 and a disk drive 53 for loading executable programmes and data, and for retrieving data from the mass storage 54.

The "raw" digital data stored in the RAM 44, and corresponding to the outputs from all the diodes in the linear array, is provided via an interface connection 13 to a processing unit 17 of a personal computer 14, where it is stored in the working memory 51. The processor 50 then operates on the line of data to derive a value corresponding to the "thickness" of the product at a point corresponding to each of the diode positions. By integrating the "thickness" values for each line of data, and repeating the integration for as many scanned lines as correspond to the "footprint" of the product on the conveyor belt, a value corresponding to the total volume of the product can be obtained.

The first stage in the procedure is a calibration stage, wherein a correlation is derived between the output of each individual diode and the "thickness" of the product at a point corresponding to the position of that diode. In the present method, this calbration stage is achieved by first recording the diode outpuit when the irradiation zone 7 is clear of obstructions, and then placing one or more calibration blocks of known thickness and transmissivity to X-radiation between the source and the diodes, and noting the output of each diode for each block.

Figures 3A, 3B:
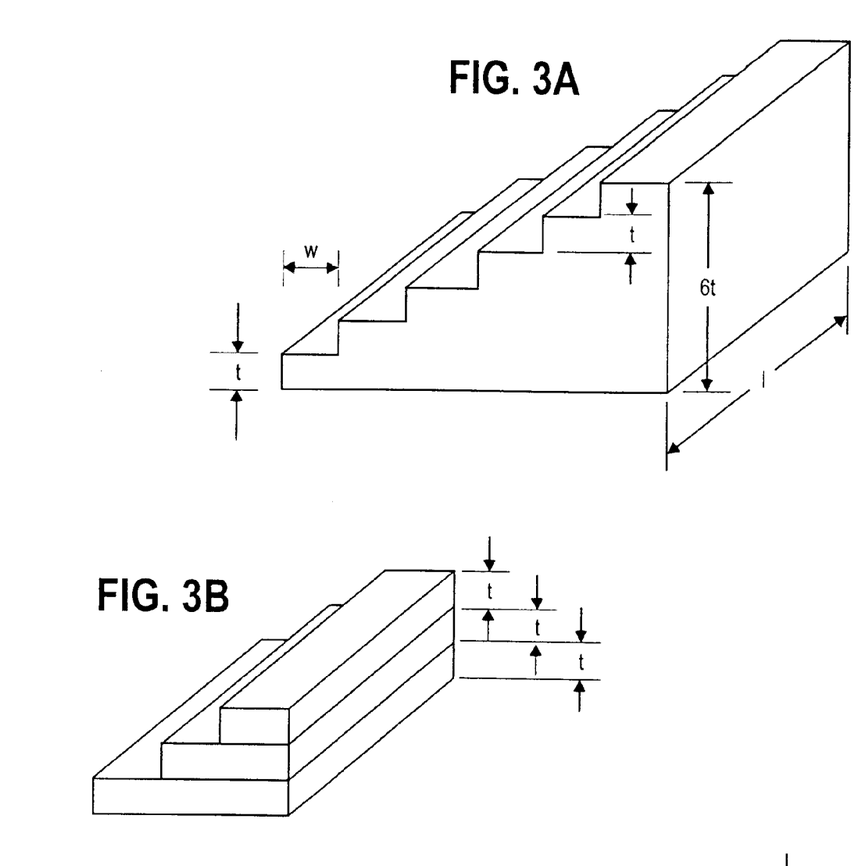
FIGS. 3a, 3b and 3c are perspective views of calibration elements used in setting up the installation.
Figure 3C:
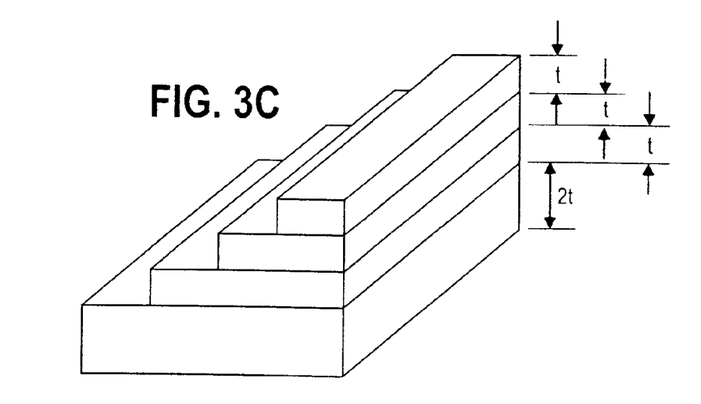

In FIG. 3, FIG. 3A shows a first test block of stepped construction. The test block comprises six steps, the thickness of the blcok varying from t to 6t in equal steps. The width W of each step may correspond to the width of the radiation zone 7, or a part thereof. The length 1 of the block is sufficient to extend along the entire length of the diode array. In FIG. 3B, a test block of stepped construction is made up of three blocks of equal thickness, and in FIG. 3C, there is shown a set of blocks comprising three blocks of a first thickness t and a fourth block whose thickness is twice that of the other three. Some or all of the blocks of FIGS. 3B or 3C may be placed in the irradiation zone to form a test piece of a predetermined thickness varying from t to 5t.

Figure 4:
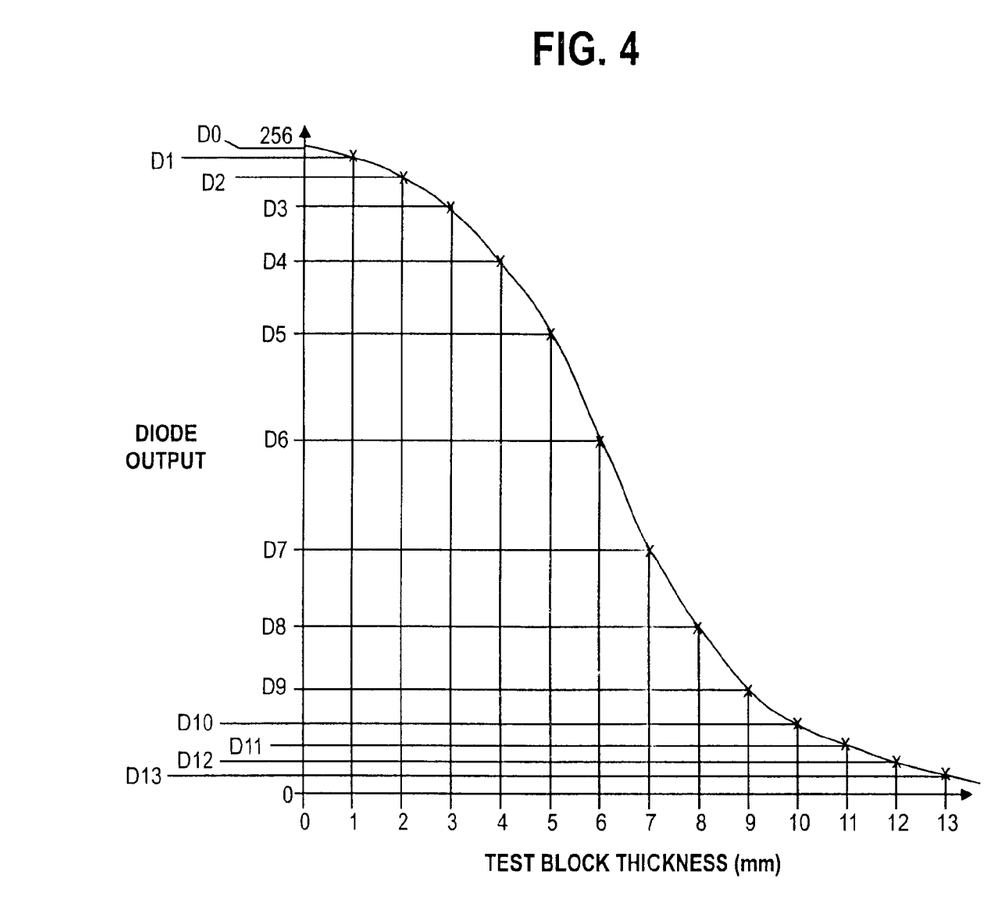
FIG. 4 is a graph showing the variation in the output of a sensor as different calibration elements pass over it.

The objective of the calibration stage is to establish a relationship between the thickness of a test block placed in the radiation zone, and the corresponding output of each diode. A graphical representation of such a relationship is seen in FIG. 4, wherein the graduations in the test block thickness are arranged to be in steps of the millimetre. In FIG. 4, the diode output has a maximum value D0 when the test block thickness is zero, i.e. when no test block is present in the radiation zone.

A slightly lower value, D1, is returned when a first test block of for example 1 mm thickness is placed in the radiation zone. Similarly, further output values D2, D3, D4 etc. are established to correspond to further test blocks or combinations of blocks with thicknesses of for example 2, 3 and 4 mm, and the series of output values shown in FIG. continues to D13. for any paticular product to be inspected, the sets of calibration blocks may be chosen to suit the "thickness" of the product, and the number of steps used in the calibration process can be chosen so that the output response range of the diodes is divided into a desired number of graduations.

A number of test blocks may be passed through the irradiation zone to provide correlations at only selected block thicknesses, and interpolation between these points may be used. For example, test blocks having thicknesses of 2, 4, 6, 8 and 10mm may be passed through the irradiation zone to provide correlated diode output readings for these thicknesses, and diode readings falling between the correlated points may be related to intermediate thicknesses by linear or other interpolation methods.

Figure 5:
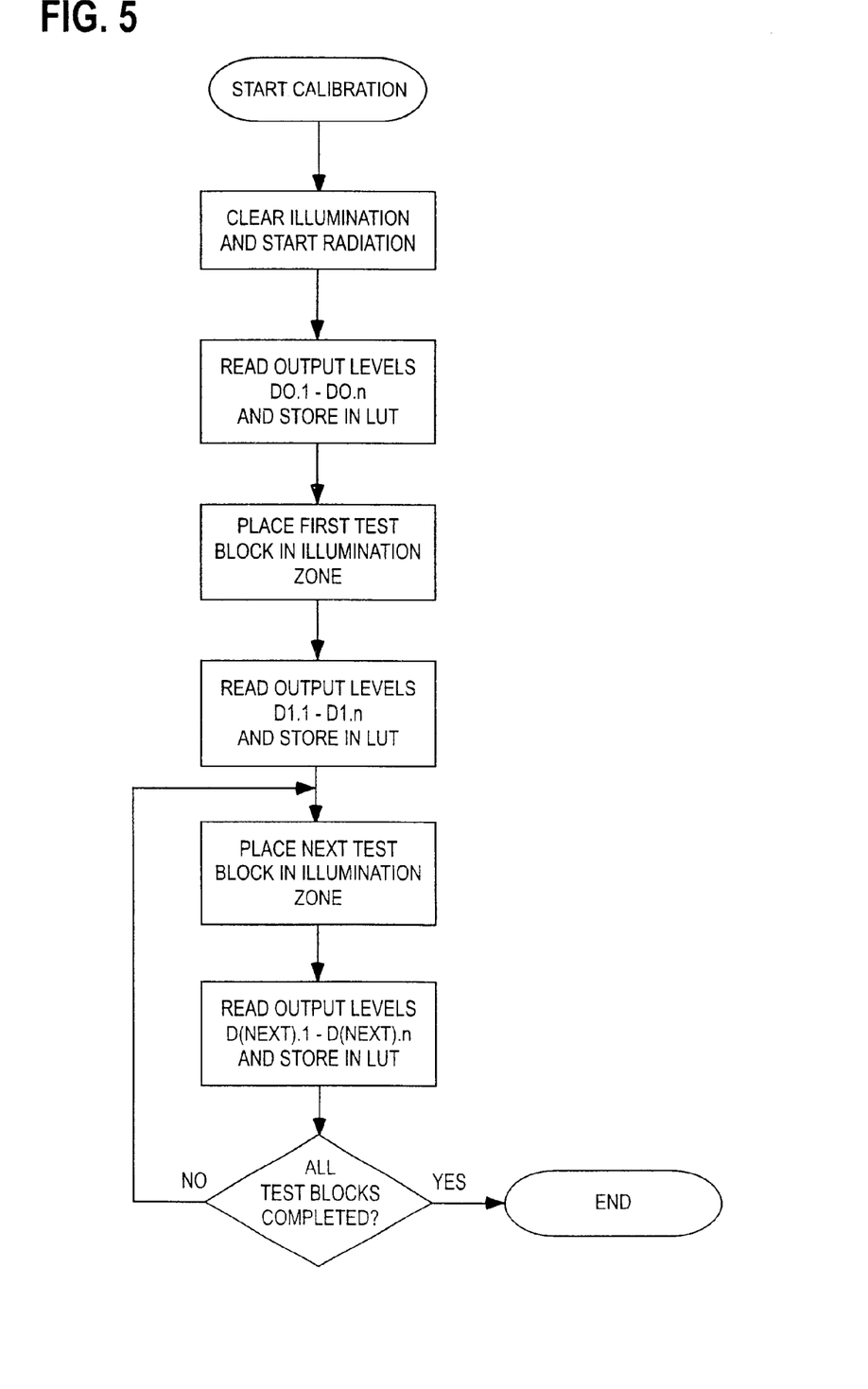
FIG. 5 is a flow chart illustrating an initial calibration sequence.
Figure 6:
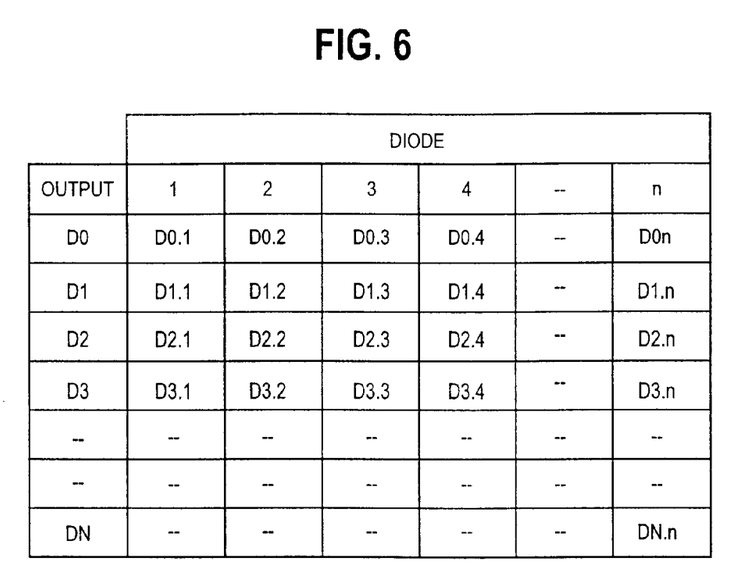
FIG. 6 is a schematic representation of the stored results of the calibration sequence of FIG. 5.

The flow chart of FIG. 5 illustrates the calibration process. At the start of the calibration process, the irradiation zone 7 is cleared and respective output levels $D0.1$ to $D0.n$ from each of the diodes 1 to n are stored in the RAM memory 44, and are then sent to the personal computer 17, where the processor 50 stores this data as the first line of a table such as is shown in FIG. 6. A first test block of known thickness is then placed in the irradiation zone 7, and the respective outputs of the diodes 1 to n stored as corresponding output values $D1.1$ to $D1.n$. A second test block is then placed in the irradiation zone 7, and the respective outputs of the diodes 1 to n are stored as corresponding output values $D2.1$ to $D2.n$. This procedure is then repeated with a number of test blocks of increasing thickness. The number of test blocks may correspond to the number N of the steps in the output range. Alternatively, a stepped test block such as is shown in FIG. 3A or combination of blocks such as are shown in FIGS. 3B and 3C may be placed on the conveyor 1 and advanced through the irradiation zone 7 in synchronism with the reading of the diode array. In such a method, the outputs from the diodes are read as each step of the test block passes between the diodes and the source, with each set of readings from the diode array forming a line of readings in the data table. The data stored in the table thus represents for each diode an output corresponding to a known thickness of test block. The number of steps in the thickness of the test block is chosen to provide a number of correlation points between diode output value and test block thickness. Linear or other interpolation techniques may beused to derive "thickness" data from diode output values falling between the correlated points. The output from the diodes typically represnets a digital "grey level" value between 0 and 255, and the correlated reading and interpolated value allow "thickness" values corresponding to each of the 256 grey levels to be asigned.

The transmissivity to x-rays of the test block material is preferably chosen so as to be substantially equal to the transmissivity to x-rays of the material of the products to be inspected. Thus, during an inspection process when a product passes through the radiation zone, a direct comparison of the output of each diode with the stored values from the calibration stage can yield a value corresponding to the "thickness" of the product at a point corresponding to the diode position. It is however also foreseen that the transmissivity of the test block material may differ from that of the product to be inspected, and providing that the ratio of the two transmissivities is knowm a value corresponding to the "thickness" of the product can be derived from the stored values in the table.

Referring again to FIG. 1, the products 2 shown on the conveyor 1 each comprise an outer package 2a, within which are contained three pouches or sachets 2b, 2c and 2d containing liquid or powder products. The satchets may be arranged in the package in a single layer, as in the left-hand package shown in FIG. 1. However, in the package on the right as seen in FIG. 1 the sachet 2d partially overlies the two satchets 2b and 2c.

Figure 7:
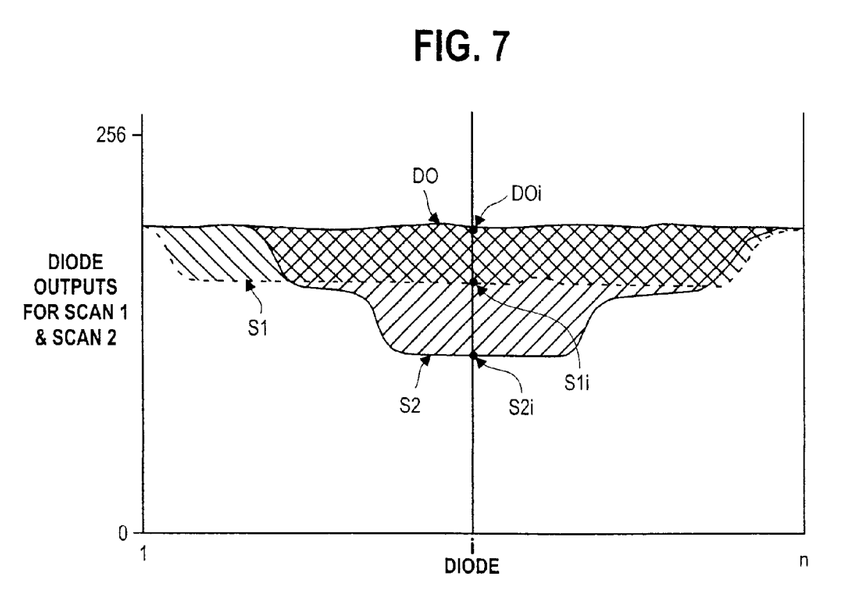
FIG. 7 is a graphical illustration of the instantaneous outputs of the sensors of the inspection installation at two timing intervals.

FIG. 7 is an illustration of three different sets of outputs from the diodes of the array 9. The upper, and generally horizontal line shows the values of D0 for each of the diodes 1 to n, these values being recorded when no product is in the irradiation zone 7.

The line S1 shows a set of readings from the diodes taken as the first package (the left-hand package of FIG. 1) passes through the irradiation zone 7. The sachets 2b, 2c and 2d are arranged in a single layer, and thus the readings from the diodes in scan S1 are depressed by a substantially uniform amount from the D0 outputs.

The line S2 shows a set of readings from the diodes taken as the second package (the right-hand package of FIG. 1) passes through the irradiation zone 7. The sachets 2b and 2c are arranged side by side on the base of the package, and the sachet 2d rests on top of the other two satchets. The scan S2 has a central zone where the diode outputs are lowest, and to side zones where the diode outputs are at a level between that of the central zone and the D0 values.

The vertical line in the mid-region of the graph (diode position i) illustrates the outputs from a diode i during the timing intervals in which the three sets of readings are taken. With the irradiation zone 7 clear, the reading from diode i is D0i. In the first scan S1, the reading from diode i is S1i, and similarly in the second scan S2 the reading from diode i is S2i.

Figure 8:
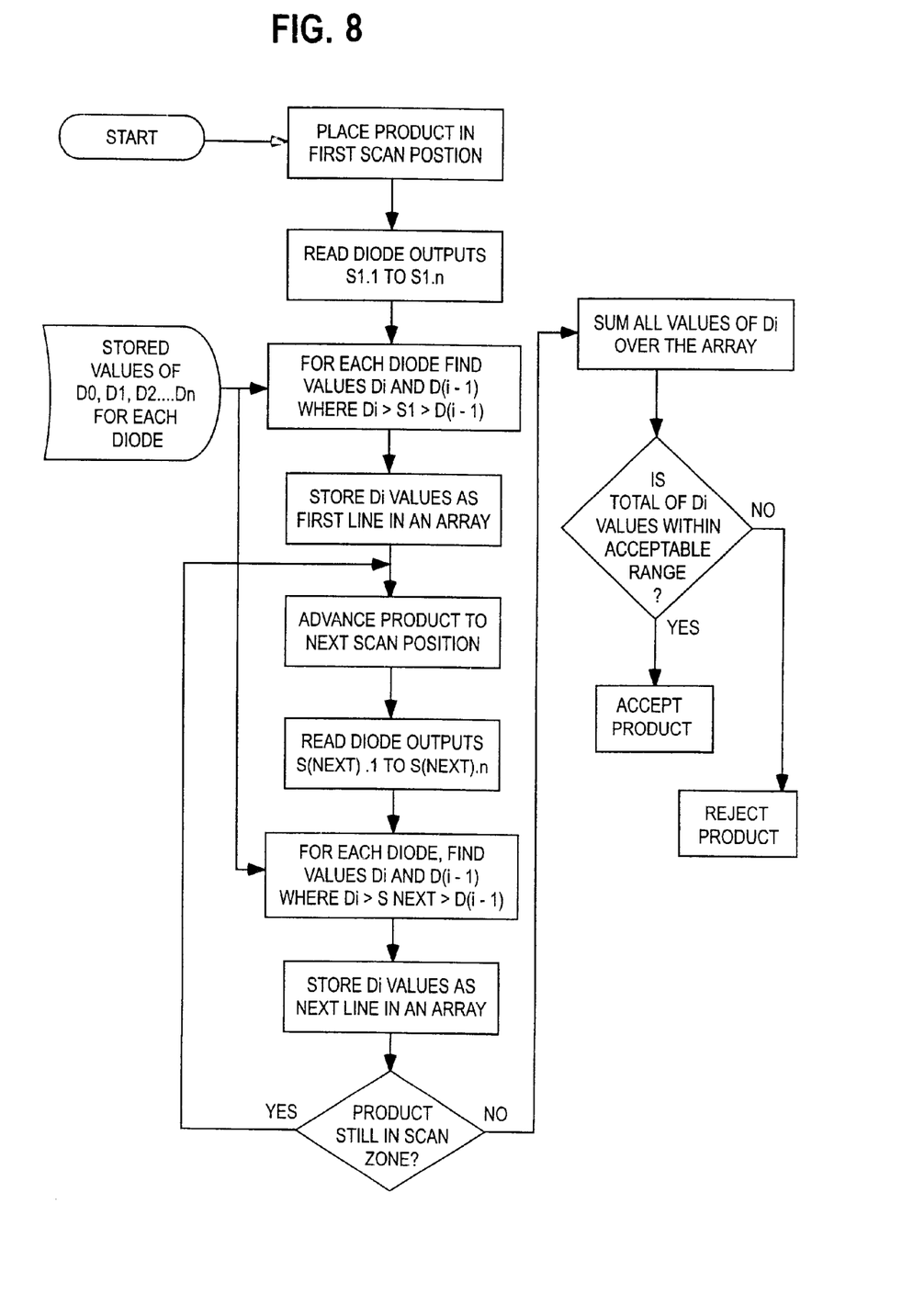
FIG. 8 is a flow diagram illustrating an automatic inspection operation.
Figure 9:
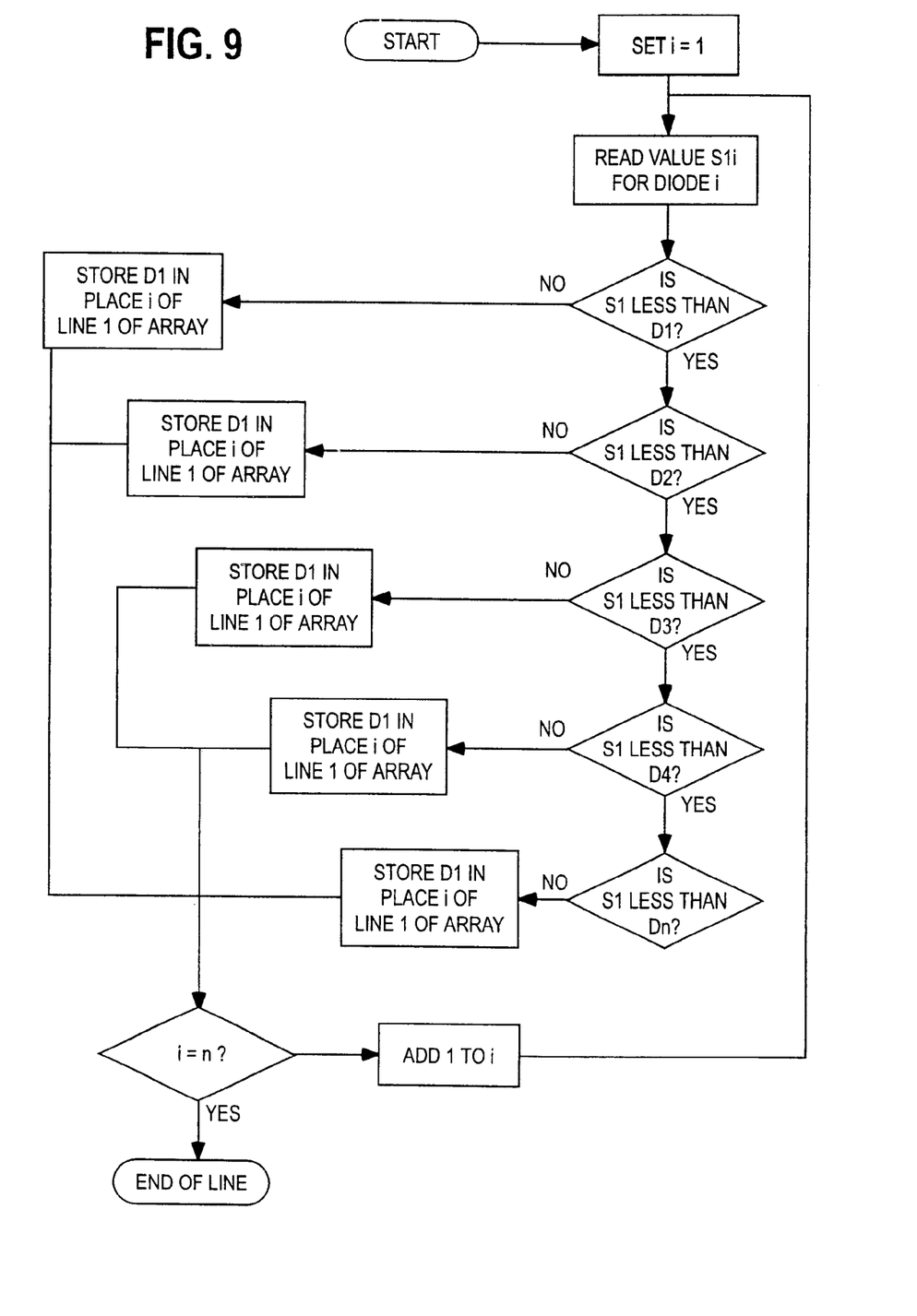
FIG. 9 is a flow chart showing an example of a process for executing a step of the inspection operation of FIG. 8.

The depression in the diode readings caused by alteration of the radiation forms the basis of measuring the volumes of the products. It can also be considered as corresponding to the cross-hatched and diagonally hatched areas of the graph of FIG. 7 respectively. FIGS. 8 and 9 are flow charts showing an automatic method of inspecting products and accepting or rejecting them on the basis of the determined volume of the product.

In FIG. 8, the calibration stage has already been carried out and the calibration values have been stored in a RAM memory 51. The product to be inspected is then advanced by the conveyor 1 to a first scan position, and the values of the diode outputs for the first scan S1.1 to S1.n are read and stored temporarily. The processor 50, under control of a programme, then takes the output S1.i of each of the diodes in turn and compares it with the stored "thickness" values D0, D1, D2 . . . DN for that diode, to find the two stored values between which the scanned value S1.i is situated. The lower of these two stored values is then written into the i-th position in a first line of a table of "thickness" measurements Di, the number of "thickness" measurements in the line corresponding to the number of diodes in the array 9.

FIG. 9 illustrates a routine for deriving the "thickness" measurements from the diode output values of each scan. When the output values have been read, the output value from the first diode S1.1 is compared to the stored value D1 for that diode, and if S1.1>D1 then the value D1 for that diode is written into the corresponding place in the first line of the table of "thickness" measurements. If S1.1<D1, then the routine compares S1.1 with the stored value D2 for that diode, and writes the value D2 into the corresponding place in the table if S1.1>D2. The routine continues, comparing the diode output value with each of the stored "thickness" values in turn and writing into the table the thickness value immediately below the scan output value for each diode. The line of "thickness" measurements is completed when this routine has been executed for each of the diodes in the array 9.

The product is then advanced to the next scan position, by moving the conveyor 1 a predetermined distance in the transportation direction. The predetermined distance is preferably substantially equal to the width of the array of photodiodes, so that successive scans of the product are substantially contiguous. It is however foreseen that the conveyor 1 may move the product through the irradiation zone at a faster speed, so that a "gap" exists between successive scanned regions of the product. While a faster conveyor speed may enable more products to be inspected the unit time, it will be understood that the measurements made of the products may lose precision due to the reduced number of measurement sites on the product.

When the product reaches the nest scan position, the outputs of the diodes S(next).1 to S(next).n are read and stored temporarily, and as before each of the diode outputs is compared with the stored "thickness" values D0, D1, D2 . . . DN for that diode. The stored "thickness" value immediately below the current diode output is found, and is written into the respective position in a second line of "thickness" measurements Di.

If the product is still in the irradiation zone, then successive lines of "thickness" values Di are derived from successive sets of diode output data, and are at recorded to build up a complete table of "thickness" measurements, each line of the table corresponding to a single scan of the product, and the number of lines in the table corresponding to the number of scans required to cover the entire footprint of the product. In order to establish whether the product is still in the irradiation zone, each completed line of "thickness" measurements Di may be compared to the stored values of D0, and if each of the diode outputs substantially corresponds to the D0 value for the diode, it can be concluded that the product is no longer in the irradiation zone and the inspection of the particular product has been completed.

The processor 50 then adds together all of the "thickness" measurements Di stored in the table, to arrive at a total. This total is representative of the volume of the product, and is compared to an acceptable range of total values. If the total lies within the acceptable range, the product is accepted. If the total is outside the acceptable range, then the product is rejected as either being over-filled if the total is too high, or if the total is too low then the product is rejected as it is likely that one or more of the sachets is missing.

In the processing methods described above, the diode outputs are compared with the corresponding "thickness" values, and the "thickness" values immediately below the diode output readings are recorded. In an allternative calibration and processing method, the calibration process is carried out using reference blocks of predetermined thickness to obtain a number of correlations between the diode output value and the test block thicknesses. When the diodes are subsequently read during a scan, each diode output is value is compared with the two stored calibration values between which it falls, and an interpolation technique is used to derive a "thickness" value corresponding to the diode output value.

For example, if test blocks having thicknesses T4 of 4 mm and T7 of 7 mm produce digital output values D(4) and D(7) of 240 and 150 (out of the 256 grey scales) respectively from a diode during a calibration stage, then an output value D(I) of 195 from the diode during an inspection scan can be processed to derive a "thickness" value ti of 5.5 mm by linear interpolation using the formula:

$$ti = T4 + (T7-T4) \cdot (D4-DI)/(D4-D7)$$

or substituting, $$ti = 4 + (7-4) \cdot (240-195)/(240-150)$$

In this alternative calibration and processing method, the number of calibration scans, and thus the number of test blocks of difering thicknesses, can be reduced as compared to the method previously described. This not only saves time, but also reduces the amount of calibration equipment necessaary.

The interpolation may be carried out using the actual diode output values from each subsequent inspection scan, or alternatively a table based on the calibration scans may be produced to provide "thickness" values correspondence to each of the possible 256 diode output values for each diode as part of the calibration process, prior to the inspection scanning stage. During an inspection, each diode output value is simply compared with the previously calculated table to produce a "thicknes" value for that diode.

As an alternative to building up a table of "thickness" measurements and subsequently adding all of the individual "thickness" measurements in the table, it is foreseen that as each "thickness" measurement is derived, it can be added to a culmative total which is then compared to an acceptable range when the programme determines that the product has left the irradiation zone. While such a method may save memory, the benefit of compiling the table of "thickness" measurements is lost, and the possibility of constructing a three-dimensional model of the product from the spatial information in the table of "thickness"measurements is also lost. Such a three-dimensional model may be constructed by representing each of the "thickness" measurements as a column of product whose height is represented by the "thickness" measurement and whose basic area corresponds to the area of a diode in the array 9, and whose positioning corresponds to its position within the table. Such a three-dimensional model is, however, dependent on the consistency in the speed of movement of the conveyor belt for its accuracy. The processing method in which only a cumulative total of the "thickness" measurements is derived and the spatial information relating to each measurement is ignored can thus not only reduce the amount of memory and processing power required to implement the method, but can also significantly reduce the hardware cost by imposing less rigorous requirements on the conveyor belt positioning control arrangements.

The processing methods described herein may be implemented in hardware or software or combinations thereof. Furthermore, the methods of processing the data from the diode array may be expressed as a set of processor-implementable instructions carried on a data carrier such as a magnetic or optical recording medium, or a signal transmissible over a network.

What is claimed is:

1. An inspection method wherein a product to be inspected is placed in an irradiation zone wherein penetrating radiation may pass through the product and impinge on a detector, the method comprising the steps of:
   measuring a first amount of radiation passing through a first area of the product and impinging on the detector;
   deriving from said first amount a first value representative of the thickness of said first area of the product;
   measuring a second amount of radiation passing through a second area of the product and impinging on the detector;
   deriving from said second amount a second value representative of the thickness of said second area of the product; and
   adding said first value and said second value.

2. An inspection method according to claim 1, wherein the detector comprises first and second sensors, and said steps of measuring said first and said second amounts comprise measuring radiation incident on each respective sensor.

3. An inspection method according to claim 2, wherein the radiation is X-radiation.

4. An inspection method according to claim 1, further including a calibration step wherein a test body is placed in the irradiation zone and a test amount of radiation impinging on the detector is measured and the test measurement stored.

5. An inspection method according to claim 4, wherein a plurality of test bodies are placed in the irradiation zone sequentially during the calibration step, and a series of test measurements corresponding to respective test bodies is stored.

6. An inspection method according to claim 4, wherein the derivation steps comprise comparing said first and second amounts with previously-stored test measurements.

7. An inspection method according to claim 6, wherein the derivation steps each comprise selecting a previously-stored test measurement on the basis of said first and second amounts.

8. An inspection method according to claim 6, wherein the derivation steps each comprise calculating a value representative of the thickness of the product on the basis of said respective first or second amount and said previously-stored test measuremnts.

9. An inspection method according to claim 1, wherein the detector comprises a linear array of sensors and the product is sequentially placed in a plurality of positions spaced in a direction perpendicular to the direction of the linear array, and wherein a value representative of the thickness of the product is derived for each sensor at each position of the product.

10. An inspection method according to claim 9, wherein the spacing between successive positions of the product substantially corresponds to the width of the linear array.

11. An inspection method according to claim 1, further comprising the step of:
   comparing the sum of said first and second values to a reference value; and
   providing an output on the basis of the result of the comparison.

12. An inspection apparatus for providing an indication of the volume of an object, comprising:
   a source of penetrating radiation;
   a detector for said penetrating radiation;
   an irradiation between said source and said detector in which the object may be placed;
   measurement means for measuring a first amount of radiation passing through a first area of the object and impinging on the detector;
   calculation means for deriving a first value representative of the thickness of the object at said first area from said first amount;
   measurement means for measuring a second amount of radiation passing through a second area of the object and impinging on the detector;
   calculation means for deriving a second value representative of the thickness of the object at said second area from said second amount; and
   adding means for adding said first value to said second value.

13. An inspection apparatus according to claim 12, wherein said detector comprises a first sensor for measuring said first amount of radiation, and a second sensor for measuring said second amount of radiation.

14. An inspection apparatus according to claim 12, including means to move said object from a first position to a second position, and wherein the detector is adapted to measure said first amount of radiation when the object is in the first position, and to measure said second amount of radiation when the object is in the second position.

15. An inspection apparatus according to claim 12, further including memory means for storing a plurality of calibration measurements.

16. An inspection apparatus according to claim 15, wherein the calculating means comprises means to derive said first value and said second value on the basis of said first and second amounts and said calibration measurements.

17. An inspection apparatus according to claim 12, comprising a plurality of detectors each adapted to measure an amount of radiation corresponding to a respective area of the object, the calculating means is adapted to derive a value representative of the thickness of the object at each respective area on the basis of the respective measured radiation amount, and wherein the adding means is adapted to add the calculated values.

18. An inspection apparatus according to claim 17, further including memory means to store the respective values representative of the thickness of the object at each respective area.

19. An inspection apparatus according to claim 17, further including memory means to store information relating to the relative positioning of the respective areas of the object.

* * * * *